Jan. 31, 1956  G. A. LYON  2,733,104
WHEEL STRUCTURE
Filed July 12, 1952
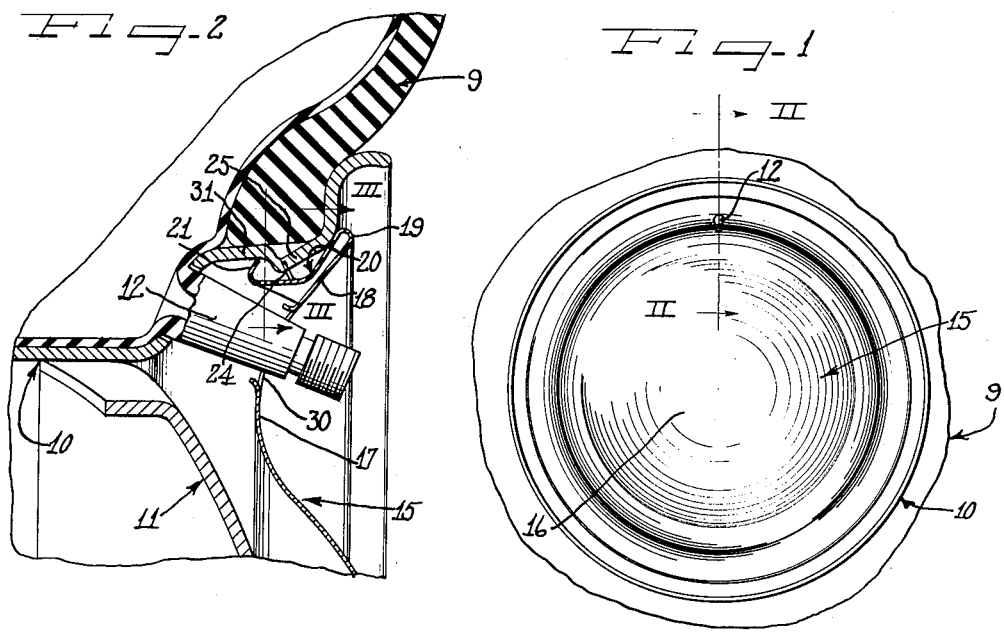
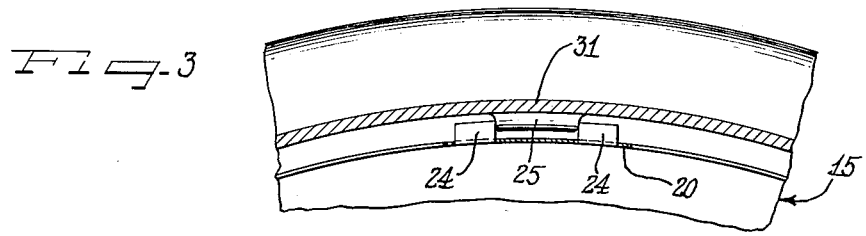
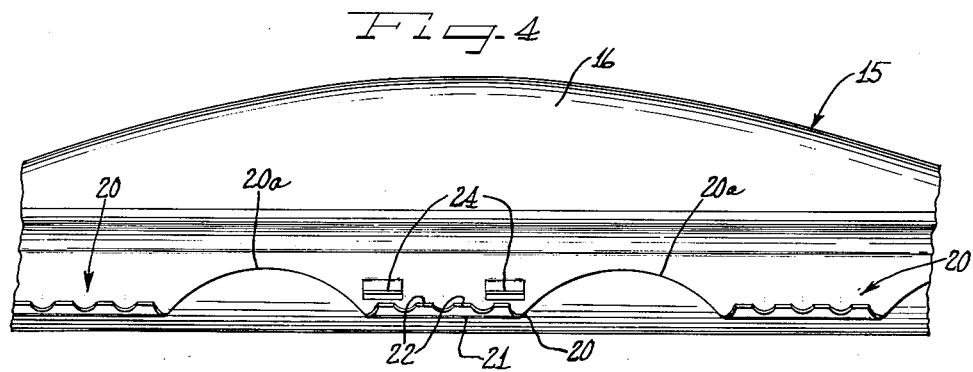
Inventor
George Albert Lyon United States Patent Office 2,733,104
Patented Jan. 31, 1956

2,733,104

WHEEL STRUCTURE

George Albert Lyon, Detroit, Mich.

Application July 12, 1952, Serial No. 298,490

6 Claims. (Cl. 301—37)

This invention relates to wheel covers and more particularly to an improved wheel cover having means for preventing it from turning on a wheel.

It is an object of this invention to make use of the retaining fingers of an automobile wheel cover not only for retaining the cover on a wheel, but also for so gripping the wheel as to prevent turning of the cover relative to the wheel.

In accordance with the general features of this invention, there is provided in a cover structure for a wheel including a body part and a tire rim carried thereby and having a flange provided with a radially inwardly projecting bump, a circular wheel cover having a plurality of retaining fingers for resiliently gripping said rim flange, at least one of said fingers having radially upstanding spaced ears between which said rim bump projects for engagement by the ears to resist turning of the cover relative to the wheel.

Another feature of the invention relates to the construction of the ears by the depressing or punching of tangs from the material of the retaining finger of the cover.

Other objects and features of this invention will more fully appear from the following detailed description taken in connection with the accompanying drawings which illustrate a single embodiment thereof and in which:

Figure 1 is a side fragmentary elevation of a wheel having my novel cover applied thereto;

Figure 2 is an enlarged fragmentary cross section taken on substantially the line II—II of Figure 1 looking in the direction indicated by the arrows;

Figure 3 is a fragmentary sectional view taken on substantially the line III—III of Figure 2 looking in the direction indicated by the arrows and showing how the bump on the wheel projects between the spaced ears or tangs on the cover; and Figure 4 is a fragmentary edge view of the cover looking at a portion of the peripheral margin of the cover and showing how the ears or tangs project from a retaining finger on the cover.

As shown on the drawings:

The reference character 9 designates a conventional pneumatic tire and tube assembly carried in the customary way upon a multi-flange drop center type of tire rim which in turn is carried upon the usual central wheel body or spider member 11 adapted for attachment to the brake drum or the like of an automobile in a manner well-known to those familiar with this art. The tire and tube assembly is provided with the customary valve stem 12 which is adapted to project laterally from the rim 10.

The aforesaid wheel is conventional with the exception of a bump 25 on a rim flange 31, which will be described more in detail hereinafter.

Cooperable with this wheel is a sheet metal wheel cover 15 embodying the features of this invention and including a central crown portion 16, a dished intermediate annular portion 17 and an outer divergent portion 18. The two portions 16 and 18 diverge from the depressed intermediate portion 17.

The radially outer portion 18 terminates in a turned edge 19 which is formed into underturned retaining fingers 20, each of which includes a relatively short stiff terminal leg 21 for detachable gripping engagement with a surface of a flange 31 of the rim. The extremity of each of the short spring finger legs 21 is serrated or toothed as indicated at 22 (Fig. 4).

It will also be clear from Figure 4 that the retaining fingers are all part of a common resilient flange having cutouts 20a which form the flange into the spaced fingers 20. The fingers may be of any suitable number such, for example, as eight to sixteen, depending upon the character of the resilient gripping engagement desired.

At this time I desire to call attention to the fact that the finger structure 20 described thus far is disclosed and claimed broadly in my copending patent application, Serial No. 223,416, filed April 27, 1951, now Patent No. 2,624,634, issued January 1, 1953, of which the present application is a continuation in part insofar as the anti-turning feature is concerned and which will now be described in detail.

At least one of the fingers 20 has depressed or punched therefrom upstanding radial circumferentially spaced ears 24—24 which are pressed from the generally axially extending flange comprising the fingers 20. These ears or tangs 24 are spaced a distance apart sufficient so that a bump 25 on a flange of the rim 10 can project therebetween, as shown in Figure 3, for engagement by the confronting side edges of the spaced tangs. This engagement is such as to resist turning of the cover relative to the wheel when the cover is on the wheel.

The bump 25 is preferably formed by depressing it from the material of the flange of the rim so that it is integral with the flange 31.

The dished annular portion 17 of the cover has an aperture or hole 30 through which the end of the valve stem 12 can project so as to make it accessible from the exterior of the cover (Fig. 2).

In the application of the cover to the wheel, the hole 30 is first aligned with the valve stem 12 and then the cover is pressed axially inward which results in the resilient fingers 20 engaging the inclined flange 31 so that the fingers are progressively cammed radially inwardly and thus have tensioned gripping engagement with the surface of the rim flange 31. Contemporaneous with this movement of the cover inwardly into the wheel, the tangs or ears 24 are brought into engagement with the ends of the bump 25 which is depressed from the rim flange 31. Inward movement of the cover is limited by the outer edge 19 of the cover bottoming against the rim.

Removal of the cover may be easily effected by inserting a pry-off tool under the cover edge 19 and by forcibly ejecting it from the wheel.

I claim as my invention:

1. In a cover for disposition at the outer side of a multi-flange tire rim having an intermediate flange with a bump pressed inwardly therefrom, a cover body formed from sheet material and having an underturned outer marginal flange extending inwardly and having a plurality of retaining fingers projecting therefrom and provided with short and stiff generally radially and axially outwardly directed cover retaining terminal flanges and engageable in self-retaining gripping relation with the intermediate flange, one of said fingers having a pair of tangs struck generally radially therefrom spaced axially outwardly from the retaining terminal of such finger and engageable at respective opposite sides of the bump on the intermediate flange when the cover is applied to the wheel for holding the cover against turning on the wheel.

2. In a wheel structure including a multi-flange tire rim having an intermediate flange with a bump pressed therein to project generally radially inwardly, a cover for the outer side of the wheel comprising a sheet material member having an outer marginal inwardly directed flange provided with retaining finger extensions having short and stiff radially and axially outwardly directed terminal flanges grippingly engageable with the intermediate flange of the tire rim, one of said fingers having struck therefrom a pair of spaced tangs disposed intermediate the retaining terminal of such finger and said inwardly directed cover marginal flange and directed generally radially toward but into spaced relation to the intermediate flange and disposed at respective opposite sides of said bump to retain the cover against turning on the wheel.

3. In a cover structure for a wheel including a body part and a tire rim having a flange adapted for retaining cooperation with a wheel cover, a circular wheel cover provided adjacent its outer periphery with an axially rearwardly projecting resilient flange provided with a body portion connected at its axially outer end to the cover and having a plurality of retaining fingers at its inner end for resiliently gripping said rim flange, said cover flange body also having radially intermediate said retaining finger and said axially outer end thereof upstanding spaced ears cooperable at spaced points with said rim flange for restraining turning of the cover on the wheel, said ears comprising tangs depressed from the material of said cover flange body.

4. In a wheel structure including a generally axially extending annular radially facing portion, a cover for disposition at the outer side of the wheel and generally over said portion, the cover having therebehind a generally axially inwardly extending cover retaining flange which is connected at its axially outer end to the cover and has the axially inner end portion thereof resiliently radially flexibly related to the cover and provided with a cover retaining terminal retainingly engageable with said radially facing annular wheel portion, said flange having integrally in one piece therewith and projecting radially from the flange intermediate said retaining terminal and said axially outer connected end of the flange a plurality of generally radially outwardly projecting retaining portions providing generally circumferentially facing edges retainingly engageable with opposing surface areas on said annular wheel portion for retaining the cover against turning.

5. In a wheel structure including a tire rim having a generally radially inwardly facing annular flange thereon provided with a generally radially inwardly extending projection thereon, a cover for disposition at the outer side of the wheel and having a portion thereof for overlying the tire rim including said annular flange, said cover having behind said portion a generally axially inwardly extending retaining flange which is provided with a body connected at its axially outer end to the cover portion and having at its axially inner extremity a retaining terminal retainingly grippingly engageable with said rim flange axially inwardly relative to said projection on said rim flange, and said retaining flange body having intermediate its connected axially outer end and its retaining terminal end and substantially spaced from said terminal end turn-preventing struck out and generally radially outwardly angled tang structure providing a generally circumferentially facing edge engageably opposing a side of the rim flange projection to restrain the cover against turning on the wheel.

6. In a wheel structure including a tire rim having a generally radially inwardly facing annular flange provided with a generally radially inwardly extending projection thereon, a cover for disposition at the outer side of the wheel and having a portion thereof for overlying the tire rim including said annular flange, said cover having behind said portion a generally axially inwardly extending retaining flange which is provided with a body connected at its axially outer end to the cover portion and having at its axially inner extremity a retaining terminal retainingly grippingly engageable with said rim flange axially inwardly relative to said projection on said rim flange, and said retaining flange body having intermediate its connected axially outer end and its retaining terminal end and substantially spaced from said terminal end a pair of circumferentially spaced turn-preventing tangs struck out and angled generally radially outwardly, said tangs providing generally circumferentially facing confronting respective edges engageable with respectively opposing sides of the rim flange projection to restrain the cover against turning on the wheel.

References Cited in the file of this patent

UNITED STATES PATENTS

| | | |
|---|---|---|
| Re. 19,467 | Lyon | Feb. 12, 1935 |
| Re. 22,042 | Lyon | Mar. 3, 1942 |
| 2,076,789 | Le Jeune | Apr. 13, 1937 |
| 2,669,487 | Horn | Feb. 16, 1954 |